Aug. 23, 1938.  E. L. ROBINSON  2,128,054
METHOD OF WORKING ALLOYS
Filed June 9, 1937
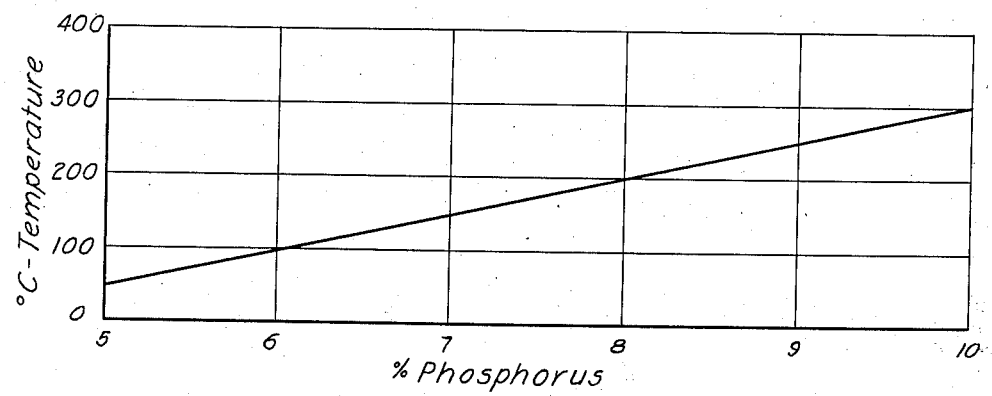
WITNESSES:
INVENTOR
Edward L. Robinson
BY
ATTORNEY Patented Aug. 23, 1938

2,128,054

UNITED STATES PATENT OFFICE 2,128,054

METHOD OF WORKING ALLOYS

Edward L. Robinson, Wilkinsburg, Pa., assignor to Westinghouse Electric & Manufacturing Company, East Pittsburgh, Pa., a corporation of Pennsylvania Application June 9, 1937, Serial No. 147,257

3 Claims. (Cl. 148—11.5)

This invention relates generally to a method of working alloys and particularly to a method of working brittle alloys of the class typified by a high phosphorus content.

At the present time, alloys containing phosphorus and copper, which are suitable for use as solder metal, are well known in the art. The phosphorus-copper alloys containing between about 5% and 10% of phosphorus are quite brittle at room temperatures. Heretofore, the phosphorus-copper solder alloys have been subjected to a hot working at temperatures of between 200° C. and 700° C. or even higher, depending upon the phosphorus content to effect a deformation of the alloy into strips which are suitable for commercial use, such as hard solder.

Such high temperature treatments are detrimental to the surface of the alloy strip since the alloy is oxidized at the high temperature which results in scaling and discoloration. The oxidation of the alloy strip also causes loss of ductility and leads to craking with attendant high metal loss on rolling. This is especially noted when producing the solder alloy in strips or sheets of .040 inch thickness or less, since the thin strips lose the heat at a high rate and consequently must be heated to quite a high temperature in order to retain sufficient heat to render them ductile in the rolls.

An object of this invention is the provision of a method for working alloys having a high phosphorus content which are suitable for use as solder metal.

Another object of this invention is the provision of a method whereby solder alloys having a high phosphorus content may be worked into thin strips without oxidizing the surface of the alloy.

Other objects of this invention will become apparent from the following description when taken in conjunction with the accompanying drawing:

The single figure of which is a curve representing the approximate temperatures at which changes between the brittle stage and the ductile stage occur for phosphorus-copper alloys having a phosphorus content ranging up to 10 percent.

This application is a continuation-in-part of Serial No. 113,188, filed November 28, 1936 and directed to the Method of working alloys.

In practicing this invention, phosphorus-copper alloys containing from about 5% to 10% by weight of phosphorus, which are suitable for use as solder metal may be prepared in any conventional manner and cast into ingots. The ingots may be subjected to hot working at temperatures of about 450° C. to 500° C. to reduce them to some convenient thickness. The ingots may be reduced to a thickness suitable for rolling the strips of solder metal in coils or may even be reduced to strips of between .025 inch and .040 inch thickness. Where desired the hot working of the alloy may be done in a protective atmosphere, such as hydrogen or other suitable protective gas.

In order to prevent oxidation of the surface of the alloy while heating the strips to a desired temperature, the hot worked strips may be placed in an oil bath, preferably of high flash point, which is heated to a temperature of between 50° C. and the flash point of the oil. The temperature of the oil bath will depend upon the content of phosphorus and other alloying elements of the alloy which is to be worked into the thin strips.

As illustrated in the single figure of the drawing, the curve of which is representative of the temperatures necessary for effecting a change from the brittle stage to the ductile stage of the phosphorus alloy for different phosphorus contents of the alloy, a copper base solder alloy containing 6% by weight of phosphorus need only be subjected to a temperature of approximately 100° C. in the oil bath, whereas a copper base solder alloy having a phosphorus content of about 8% by weight requires a temperature of about 200° C. for effecting a change from the brittle stage to the ductile stage. Although the curve shown in the drawing is representative of the changes between the brittle and ductile stage of a copper base alloy containing phosphorus, it is understood that the change represented by the curve will differ for different ingots of an alloy having the same phosphorus content due to unevenness in the composition, grain structure of the cast ingot and other conditions which are well known to those skilled in the art.

It has been found through tests that when strips which have previously been hot worked to a thickness of about .025 inch in the manner hereinbefore described are immersed in an oil bath (not shown) having a temperature slightly above the temperature necessary to effect a change of the alloy from the brittle stage to the ductile stage for a period of time of less than one minute, the alloy is rendered sufficiently ductile to permit a further deformation into strips of the desired thickness without an accompanying oxidation of the alloy.

In order to effect the further deformation of the strips after they are temporarily rendered ductile by means of the oil bath heating, the strips of the copper base solder alloy containing phosphorus may be rolled in a set of suitable rolls (not shown) to effect a predetermined reduction in thickness per pass. In practice, a reduction in thickness of substantially 8% to 20% per pass may be given the ductile strip of solder alloy without damage to the strip. A reduction of more than 20% per pass tends to cause splintering of the material. In subjecting the strip to the action of the rolls to effect the reduction, the rolls may be heated by any external means such as is well known to those skilled in the art to prevent undue chilling of the strip of solder metal during the reduction. The rolls need not be heated to the temperature of the oil bath where temperatures slightly below the flash point of the oil are used to render the alloy ductile, since it is found through experiments that a temperature of about 100° C. in the rolls is satisfactory to prevent the fast chilling of the strips which have been heated in the range described. A reduction in the thickness of the strip of solder metal to a desired thickness of between .004 and .006 inch may thus be obtained by alternately heating the hot rolled strip of solder metal in the oil bath for a period of time of less than one minute and passing the ductile strip through the rolls to reduce the strip substantially .002 to .005 inch per pass.

Although it is possible that the hot working of the ingot at a temperature of 450° C. to 500° C. may oxidize the surface of the alloy, it is found that by alternately immersing the hot worked alloy in the oil bath and then passing it through the heated rolls, as hereinbefore described, the scale occasioned by the previous oxidation of the alloy is usually removed.

This method of working alloys having a high phosphorus content which are suitable for use as solder may be employed satisfactorily in producing strips having a thickness of about .005 inch or less. As the thin strips emerge from the heated rolls, their surfaces are bright and free from scale. Further, by this method, it is possible to handle the high phosphorus copper base alloys in coil form, whereas prior to this invention it was possible only to handle the solder alloys having a high phosphorus content in stick or rod form.

In a specific example of this invention, strips of copper base alloy containing 7% by weight of phosphorus and which were previously hot worked to a thickness of .025 inch were immersed in an oil bath having a temperature of about 225° C. for a period of time of about 45 seconds to render the strips ductile. The ductile strips were then immediately passed through rolls which were externally heated to a temperature of about 80° C. to prevent undue chilling of the alloy to effect a reduction in thickness of between .002 and .005 inch. By repeating the steps of immersing the strip in the oil bath and passing it through the heated rolls, the hot worked strip of copper base solder metal containing 7% by weight of phosphorus may be reduced to a thin strip of about .005 inch thickness having clean bright surfaces.

The method of this invention is applicable to any of the copper base alloys having a phosphorus content of between 5% and 10% by weight which are suitable for use as solder. Some of the copper base metals containing sufficient phosphorus to render them brittle in the cold state which are employed as solder metals and to which this invention is applicable are the binary copper-phosphorus alloys containing between 5% and 10% by weight of phosphorus, the copper base alloys containing between 5% and 10% by weight of phosphorus and up to 25% by weight of silver, up to 32.5% by weight of zinc, up to 7% by weight of tin, or up to 25% by weight of cadmium, or combinations of these constituents in a copper base containing between 5% and 10% by weight of phosphorus and which are brittle in the cold state.

In a particular application of the method of this invention to a copper-silver-phosphorus alloy containing about 15% by weight of silver and about 5% by weight of phosphorus with the balance copper, the alloy was hot worked into a strip of about .125 inch thick. In this form, the copper-silver-phosphorus alloy was brittle in spots. The alloy was rendered sufficiently ductile for a further reduction in thickness without breakage and without an accompanying oxidation of its surfaces, by immersing it in an oil bath at a temperature of about 150° C. for a period of time of about 45 seconds. The strip was then reduced in thickness by passing it directly from the oil bath to and through rolls which were heated to a temperature of about 75° C. to effect a reduction of from 8% to 20% in thickness. Repeated alternate immersions of the strip in the oil bath and passing it through the rolls effected a reduction to about .005 inch in thickness.

Although this invention has been described with refeence to a particular embodiment thereof, it is, of course, not to be limited thereto, except insofar as is necessitated by the prior art and the scope of the appended claims.

I claim as my invention:

1. The method of working a solder alloy containing a predominating proportion of copper and between about 5% and 10% by weight of phosphorus which has been hot worked into a strip having a thickness of not less than .025 inch, which comprises, immersing the strip of alloy in an oil bath having a temperature of between 50° C. and the flash point of the oil for a period of time of less than one minute to prevent oxidation of the alloy during the heating and to render it ductile, and directly thereafter rolling the ductile strip of alloy in heated rolls to effect a reduction in thickness of substantially 8% to 20% per pass.

2. The method of working a solder alloy containing a predominating proportion of copper and between about 5% and 10% by weight of phosphorus which has been hot worked into a strip having a thickness of substantially .025 to .04 inch which comprises immersing the strip of alloy in an oil bath having a temperature of between 50° C. and the flash point of the oil for a period of time of less than one minute to prevent oxidation of the alloy and to render it ductile, rolling the ductile strip of alloy directly thereafter in heated rolls to effect a reduction in thickness of substantially 8% to 20% per pass, repeating the steps of immersing the strip of alloy in the oil bath and directly thereafter rolling the ductile strip to effect the reduction in thickness until a desired thickness is obtained, the heated rolls having a temperature of about 100° C. to prevent chilling of the strip before the reduction in thickness is effected.

3. The method of working a solder alloy containing a predominating proportion of copper and between about 5% and 10% by weight of phosphorus which has been hot worked into a strip having a thickness of not less than .025 inch which comprises, alternately immersing the strip of alloy in an oil bath having a temperature of between 50° C. and the flash point of the oil for a period of time sufficient to thoroughly heat the strip to render it ductile while preventing oxidation of the alloy, and directly thereafter rolling the ductile strip of alloy in heated rolls to effect a reduction in thickness of the strip of substantially 8% to 20% per pass, the heated rolls having a temperature sufficient to maintain the strip ductile while effecting the thickness reduction.

EDWARD L. ROBINSON.